Patented Oct. 18, 1949

2,485,507

UNITED STATES PATENT OFFICE 2,485,507

CHLORINATED HYDROCARBON

Melvin A. Perkins, Wilmington, Del., assignor to the United States of America as represented by the United States Atomic Energy Commission No Drawing. Application July 27, 1944, Serial No. 546,915

1 Claim. (Cl. 260—654)

This invention relates to the production of highly chlorinated organic compounds and is particularly concerned with the manufacture of such compounds containing eight carbon atoms from chlorinated hydrocarbons of lower molecular carbon content.

An object of the invention is the production of new high-boiling oils suitable for use as heat transfer media and as intermediates for the manufacture of other highly halogenated products.

In accordance with the present invention, the octachlorohexene obtained by condensing or dimerizing in the presence of a Friedel-Crafts condensing agent two molecules of a tetrachloropropene having one and only one hydrogen in 1-position, is further condensed with trichlorethene in the presence of a Friedel-Crafts condensing agent. The product of the condensation comprises a mixture of chlorinated compounds, with the undecachloro-octene, $C_8H_5Cl_{11}$, predominating. The reactions involved are of the type known generally as the Prins reaction.

The crude reaction product from the dimerization of tetrachloropropene contains uncondensed tetrachloropropene as well as the Prins type dimer. When this crude product is condensed with trichlorethene, by-products containing 5, 6, 7 and possibly 9 carbon atoms are obtained as a result of condensation of one, two, or three molecules of trichlorethene with one molecule of tetrachloropropene. Even when a relatively narrow distillate fraction obtained by distilling the crude dimerization product, for example, a 135–145° cut at 2.5 mm. of pressure, is used, the undecachlorooctene is obtained in admixture with such by-products. However, the proportion of such products in this case is substantially smaller.

The condensation of two molecules of 1,2,3-tetrachloropropene results in the formation of normal 1,2,3,4,5,5,6,6-octachlorohexene-1. Upon condensation of this chlorinated hexene with trichlorethene a replacement of the chlorine in the 3-position takes place, and this chlorine migrates to the remaining free bond of the ethylene radical to form the chlorinated 3-ethyl-hexene-1 having the formula

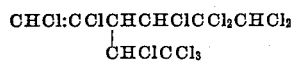

The undecachloro-octene can be dehydrohalogenated to compounds containing two or more double bonds and from about 72% to about 78% chlorine by treatment with alcoholic alkali-metal hydroxide. This treatment is advantageous in the preparation of certain highly halogenated compounds such as fluorine derivatives since the elimination of hydrogen in the dehydrohalogenation not only reduces the quantity of fluorinating agent required but also provides a product which may be fluorinated with less violence than the products containing a higher hydrogen content.

The fluorination of products of the present invention to produce novel fluorocarbons and organic fluorochlorides constitutes the subject matter of my United States Patent application Serial Number 546,916, entitled "Fluorinated organic compounds and method of making", filed on the same date herewith.

The condensation process of the invention proceeds at ordinary room temperature or slightly elevated temperatures. The reaction starts, for instance, at a temperature of about 20° C. and may be carried to substantial completion with a temperature rise of only four or five degrees. At temperatures below about 10° C. the reaction is very slow. However, the reaction can be carried out at higher temperatures, and temperatures as high as 60° or 65° C. can be permitted for a short period without seriously reducing the yields of the desired products. Since the condensation of trichlorethene with itself becomes noticeably rapid at temperatures above 50° C., it is desirable to avoid such temperatures in order to prevent condensation of the trichlorethene in this way rather than with the tetrachloropropene dimer.

The process may be carried out using an excess of either trichlorethene or the tetrachoropropene dimer. The use of an excess of trichlorethene has the advantage that a relatively fluid solution of the reaction product is obtained as compared with the more viscous products when equimolar proportions are used or when an excess of the dimer is used.

The process may be carried out using a conventional Friedel-Crafts catalyst, for instance, a chloride of aluminum, iron, tin, titanium, zirconium or zinc, or aluminum bromide or boron fluoride or mixtures of such catalysts.

The following examples illustrate the process (quantities are expressed as parts by weight):

EXAMPLE 1

Part A.—Preparation of tetrachloropropene dimer 100 parts of a crude 1,2,3,3-tetrachloropropene, having a specific gravity of 1.54 and obtained by dehydrohalogenation of symmetrical pentachloropropane by means of alcoholic sodium hydroxide, were mixed with 7.5 parts of anhydrous aluminum trichloride (AlCl₃) at room temperature. The temperature of the mixture rose to 23° C.; the mixture was then heated to 40° C. and maintained at a temperature between 40° and 45° C. for 2½ hours. The product comprised crude, normal 1,2,3,4,5,5,6,6-octachlorohexene-1.

Part B.—*Condensation of crude dimer with trichlorethene*

The reaction mixture produced in Part A was added to 346 parts of trichlorethene maintained at 20° C. in a period of 1½ hours, the mixture being agitated continuously. After the addition of the mixture was completed, stirring was continued for 16 hours at a temperature between 20° and 24° C.

112 parts of an aqueous 4% HCl solution were then added to the mixture to decompose the metal complex, and excess trichlorethene was stripped by distilling off 304 grams of distillate. This distillate was substantially entirely trichlorethene.

The distillation residue was found to be too viscous to separate readily from the aqueous solution so 75 parts of trichlorethene were added to reduce the viscosity of the oil phase. The oil phase was separated from acid solution, washed with water, and dried by shaking it with anhydrous calcium sulfate and then separating it from solid matter by filtration. During these operations some trichlorethene was lost by evaporation. 169 parts of filtrate were obtained.

The product was distilled at atmospheric pressure to remove 59 parts of distillate. 110 parts of a very viscous oil remained as distillation residue. This oil was distilled at 2½ mm. of mercury absolute pressure giving the following fractions:

(a) From 170° to 175° C., 18 parts;
(b) From 175° to 190° C., 43.5 parts;
(c) From 190° to 200° C., 34 parts;
(d) Distillation residue, 12 parts.

All fractions were reddish-orange in color and progressively more viscous as the distillation temperature rose.

The molecular weights of the first three fractions were about 340, about 460, and about 490, respectively. The first fraction is evidently a 6-carbon compound or a mixture of such compounds. The second fraction is considered to be a mixture of a small proportion of 6-carbon compounds and a small proportion of undecachloro-octene and larger proportions of decachloroheptene ($C_7H_4Cl_{10}$). The third fraction is primarily the undecachloro-octene with some lower molecular weight compounds present as impurities.

EXAMPLE 2

*Condensation of distilled dimer with trichlorethene*

A tetrachloropropene dimer prepared as described in Example 1, Part A, was fractionally distilled to secure a concentrated octachlorohexene fraction distilling off (at 2.5 mm. of mercury absolute pressure) between 135° and 145° C. 50 parts of this fraction were mixed with 4 parts of aluminum chloride (AlCl₃) and 75 parts of trichlorethene in a glass vessel.

During mixing the temperature of the reaction mixture tended to rise and it was maintained between 20° and 26° C. by external cooling. Mixing was continued for 21 hours. During this period the mass first turned red, then became dark.

The product was mixed with 56 parts of aqueous 4% HCl solution. The oil was separated from the aqueous phase by decantation and was washed acid-free with water. The washed oil was topped to remove 41 parts of trichlorethene as distillate. 73 parts of a viscous oil having a density of 1.71 at 30° C. were obtained.

70 parts of this oil were distilled at an absolute pressure of 2 mm. of mercury yielding 2.5 parts of distillate below 185° C. and 47.5 parts of distillate at 185° to 208° C. and 12.5 parts of distillation residue. Most of the distillate distilled off at 198° to 202° C. This comprised the undecachloro-3-ethyl-hexene-1 of the general formula

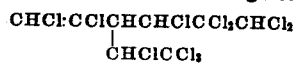

It was clear red oil which tended to string in the condenser.

EXAMPLE 3

*Dehydrochlorination of $C_8H_5Cl_{11}$*

50 parts of a distillate oil (a 185–200° C. fraction at 2.5 mm. absolute pressure) obtained by the process of Example 2 were mixed with 20 parts of methanol and 24 parts of ethanol, and to the mixture 43.8 parts of aqueous 30% NaOH solution were added in small increments as follows:

14.6 parts added: The temperature rose to 50° C. Color changed from red to purple to brown. The mixture was cooled to room temperature.
14.6 parts added: The temperature rose to 35° C. The mixture was heated at 50° C. for 1¾ hours to complete solution.
4.3 parts added: The mixture was agitated 2 hours longer.
4.3 parts added: The mixture was agitated 2½ hours longer.
4.3 parts added: The mixture was agitated 8 hours longer.
1.7 parts added: The mixture was agitated 16 hours longer.

The product was washed with water and diluted with trichlorethene. The resulting emulsion was dehydrated by distillation using tetrachlorethene as an entrainer to carry off water.

41.5 parts of the oil product were then distilled at 2 mm. of mercury absolute pressure, and the following fractions were recovered:

(a) Below 135° C., 1.5 parts;
(b) From 135° to 145° C., 9.5 parts;
(c) From 145° to 155° C., 8.0 parts;
(d) From 165° to 175° C., 3.0 parts;
(e) Distillation residue, 15.0 parts.

The chlorine contents and molecular weights of the fractions distilling from 135° to 145° and from 145° to 155° C. were, respectively, 73.1% and 73.6%, and about 350 and about 370. These values correspond to mixtures of $C_8HCl_7$ and $C_8H_2Cl_8$.

EXAMPLE 4

*Dehydrochlorination of $C_8H_5Cl_{11}$*

A crude undecachloro-octene fraction prepared as described in Example 1 and distilling between 175° and 200° C. at 2½ mm. of mercury absolute pressure was topped to remove material boiling off below 185° C.

49 parts of the topped oil were mixed with 24 parts of methanol. Into this mixture 26 parts of 30% NaOH were added drop by drop. The temperature was permitted to rise to between 40° and 50° C., and the addition of sodium hydroxide was controlled to avoid any further temperature rise.

The sodium hydroxide solution was completely spent in ½ hour, and 2.6 parts more were added.

This was absorbed in another ½ hour. 37 parts of trichlorethene were added and the mixture was washed with water. 77 grams of oil having a density of 1.64 at 30° C. were obtained. This oil was topped to a temperature of 150° C. to remove trichlorethene, leaving a residue of 43 grams of viscous oil having a density of about 1.6 at 35° C. The oil had a dark straw color.

To purify the product it was mixed with 3 parts of anhydrous aluminum chloride and stirred at room temperature overnight. By morning the mixture had solidified. It was warmed and immediately became thin. The metal complex was decomposed with dilute hydrochloric acid solution. The oil was diluted with 65 parts of trichlorethene, separated from the aqueous acid solution, and washed acid-free with water.

The product was topped to a temperature of 150° C. leaving 43 grams of residual oil. This oil was distilled at an absolute pressure between 2 and 3 mm. of mercury yielding the following fractions:

(a) From 132° to 162° C., 9.5 parts;
(b) From 162° to 177° C., 6.5 parts;
(c) From 177° to 192° C., 4.5 parts;
(d) Distillation residue, 13.5 parts.

The three distillate fractions had the following chlorine contents and molecular weights:

Fraction (a):
　Chlorine content 74.9%,
　Molecular weight about 380;

Fraction (b):
　Chlorine content 75.9%,
　Molecular weight about 420;

Fraction (c):
　Chlorine content 76.9%,
　Molecular weight about 450.

These data indicate that the product was a mixture of compounds of molecular formulae $C_8H_2Cl_8$ to $C_8H_4Cl_{10}$, with these two specific compounds predominating in the first and last fractions, respectively, and the intermediate $C_8H_3Cl_9$ predominating in the intermediate fraction.

It will be understood that I intend to include variations and modifications of the invention and that the preceding examples are illustrations only and in no wise to be construed as limitations upon the invention, the scope of which is defined in the appended claim, wherein

I claim:

As a new product of manufacture, a highly chlorinated hydrocarbon having the structural formula:

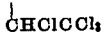

MELVIN A. PERKINS.

REFERENCES CITED

The following references are of record in the file of this patent:

Prins: "Rec. des. Trav. Chim. des Pays. Bas.," vol. 57, pages 659–66 (1938).